United States Patent [19]

Harada et al.

[11] Patent Number: 5,184,050
[45] Date of Patent: Feb. 2, 1993

[54] SUNROOF MOTOR WITH ROOF LID POSITION DETECTOR

[75] Inventors: Naoto Harada; Shuji Sekine; Takeo Furuya; Nobuo Yoshioka, all of Yokohama, Japan

[73] Assignee: Jidosha Denki Kogyo K.K., Yokohama, Japan

[21] Appl. No.: 818,095

[22] Filed: Jan. 8, 1992

[30] Foreign Application Priority Data

Jan. 11, 1991 [JP] Japan .............. 3-000480[U]

[51] Int. Cl.[5] .............................. B60J 7/05
[52] U.S. Cl. .................. 318/467; 318/266; 318/286
[58] Field of Search ............ 318/256, 264, 265, 266, 318/267, 283, 286, 466, 467, 468; 296/223

[56] References Cited

U.S. PATENT DOCUMENTS

| | | | |
|---|---|---|---|
| 4,394,605 | 7/1983 | Terazawa | 318/280 |
| 4,559,484 | 12/1985 | Hirano | 318/443 |
| 4,914,367 | 4/1990 | Niewiadomski et al. | 318/663 |
| 4,922,171 | 5/1990 | Ohi | 318/471 |
| 4,983,896 | 1/1991 | Sugiyama et al. | 318/286 |
| 5,039,925 | 8/1991 | Schap | 318/282 |
| 5,098,152 | 3/1992 | Sakai | 296/223 |

Primary Examiner—Bentsu Ro
Attorney, Agent, or Firm—Sughrue, Mion, Zinn, Macpeak & Seas

[57] ABSTRACT

A sunroof motor having a roof lid position detector which comprises a motor part, a roof lid detective disc to be turned as much as an angle in proportion to an amount of movement of a roof lid driven by the motor part, a contact plate having contacts and disposed on the roof lid detective disc, a printed wiring board mounted with a relay to supply or shut off the electric power to the motor part and formed with a motor driving circuit which is provided with board-side contacts to be in contact electrically with the contacts of the contact plate for detecting the roof lid to arrive at the full-opened position, full-closed position and so on, for example.

3 Claims, 6 Drawing Sheets

SUNROOF MOTOR WITH ROOF LID POSITION DETECTOR

BACKGROUND OF THE INVENTION

1. Field of the Invention

This invention relates to a sunroof motor used for driving a roof lid of a sunroof apparatus mounted on automotive vehicles, and more particularly to a sunroof motor provided with a roof-lid detector for detecting the roof lid to arrive at predetermined positions such as a full-opened position, a full-closed position and a lift-up position, for example, and shutting off the electric power.

2. Description of the Prior Art

Heretofore, there has been used a sunroof motor shown in FIG. 5, for example. A sunroof motor 51 shown in the figure is composed of a motor part 52 and an output part 53, the output part 53 is provided with a gear case 54 housed with a worm wheel.

The gear case 54 is formed in one body united with an end bracket 56 to cover a motor casing 55 of the motor part 52, and the worm wheel is meshed with a worm formed on an end of a motor shaft passing through the end bracket 56.

An end of an output shaft 57 fixed with the worm wheel extrudes outwardly passing through the gear case 54, and is fitted with a cam wheel 59 having a projection 59a and a pinion 58 successively. The pinion 58 is wound with a wire connected to a roof lid and stretched between the pinion 58 and the roof lid, and the roof lid is so structured as to be driven in the opening or closing direction by transmitting power through the wire. And the gear case 54 is disposed with a gear shaft pin 60a, and the gear shaft pin 60a is fitted with a gear 60 turned according to the rotation of the output shaft 57. The gear 60 is provided with a plurality of teeth 60b meshed with the projection 59a of the cam wheel 59 at the outer periphery thereof, and the gear 60 is so designed as to turn as much as one tooth at every rotation of the cam wheel 59.

Three microswitches 61, 62 and 63 are disposed in the outer periphery of the gear 60 (the microswitch 63 is sited behind the microswitch 61 and invisible in FIG. 5), and the gear 60 is formed with cam claws 60A, 60B and 60C for pushing switch knobs 61a, 62a and 63a of the microswitches 61, 62 and 63, respectively. The microswitches 61, 62 and 63 are arranged so as to detect the position of the roof lid by pushing the respective switch knobs 61a, 62a and 63a of the microswitches 61, 62 and 63 with corresponding cam claws 60A, 60B and 60C of the gear 60 when the roof lid arrives in the predetermined positions, that is, the full-opened position, the full-closed position and the tilt-up position.

Additionally, the sunroof motor 51 is provided with a relay 64 through a wire harness 65 for supplying or shutting off the electric power to the motor part 52 thereof in response to the operation of a sunroof switch and the working of the microswitches 61, 62 and 63.

In the sunroof motor 51, when the roof lid is moved to the full-opened position from the full-closed position by operating the sunroof switch, the cam wheel 59 rotates by the rotation of the output shaft 57, and the gear 60 turns according to the rotation of the cam wheel 59.

When the roof lid arrives at the full-opened position, the cam claw 60A of the gear 60 pushes the switch knob 61a of the microswitch 61 corresponding to the full-opened position, whereby the roof lid is detected to arrive at the full-opened position and the output shaft 57 stops to rotate. Namely, the roof lid stops at the full-opened position.

However, in the aforementioned conventional sunroof motor 51, the microswitches 61, 62 and 63 may clatter at the time of detecting the roof lid to arrive in the respective positions by pressing or releasing the switch knobs 61a, 62a and 63a of the respective microswitches with the cam claws 60A, 60B and 60C of the gear 60. And there is a problem since there is the possibility that the clatter noise is offensive to the passenger's ear.

Furthermore, in the sunroof motor 51, it is complicated to determine the positions of the microswitches 61, 62 and 63 so as to work with high accuracy at the time of mounting them on the sunroof motor 51, additionally, the relay 51 is connected with the sunroof motor 51 through the wire harness 65. Accordingly, there is another problem in that the assembling work requires too many man-hours.

SUMMARY OF THE INVENTION

This invention, therefore, is directed to solve the aforementioned problems of the prior art. It is an object to provide a sunroof motor which never makes a noise unpleasant to the passengers at the time of stopping or moving the roof lid at or from predetermined positions by detecting the position of the roof lid, and is possible to contribute to a reduction in the production cost by reducing the assembling man-hour.

The construction of the sunroof motor according to this invention in order to accomplish the above mentioned object is characterized by comprising a motor part for rotating an output shaft forwardly and reversely, a roof lid detective disc to be turned according to the rotation of the output shaft as much as an angle in proportion to an amount of movement of a roof lid driven by the forward and reverse rotation of the output shaft, a contact plate disposed on a face of the roof lid detective disc and provided with a plurality of contacts, and a printed wiring board disposed opposite to the face of the roof lid detective disc, mounted with a relay to supply or shut off the electric power to the motor part, and formed with a motor driving circuit provided with a plurality of board-side contacts for detecting the roof lid to arrive at predetermined positions on basis of electric contact with the contacts of the contact plate and shutting off the electrical power to the motor part through the relay.

In the sunroof motor according to this invention having the above-mentioned structure, when the roof lid is moved, for example, into the full-opened position according to an ON-operation of the sunroof switch, the roof lid detective disc turns according to the movement of the roof lid. And when the roof lid arrives at the full-opened position, the roof lid is detected to arrive at the full-opened position by sensing one of contacts of the contact plate disposed on the roof lid detective disc to contact electrically with the board-side contact in the motor driving circuit corresponding to the full-opened position of the roof lid, and the rotation of the output shaft is stopped by shutting off the power supply to the motor part through the relay mounted on the printed wiring board. Whereby, the roof lid stops at the full-opened position without making an unpleasant noise. And the cost of the product decreases in consequence of the reduction of the assembling man-hour as compared with the conventional sunroof motor since the sunroof motor according to this invention is not disposed with microswitches and is mounted with the relay directly on the printed wiring board differing from the conventional one.

DESCRIPTION OF THE PREFERRED EMBODIMENT

An embodiment of the sunroof motor according to this invention will be described below on bases of drawings.

Figure 1:
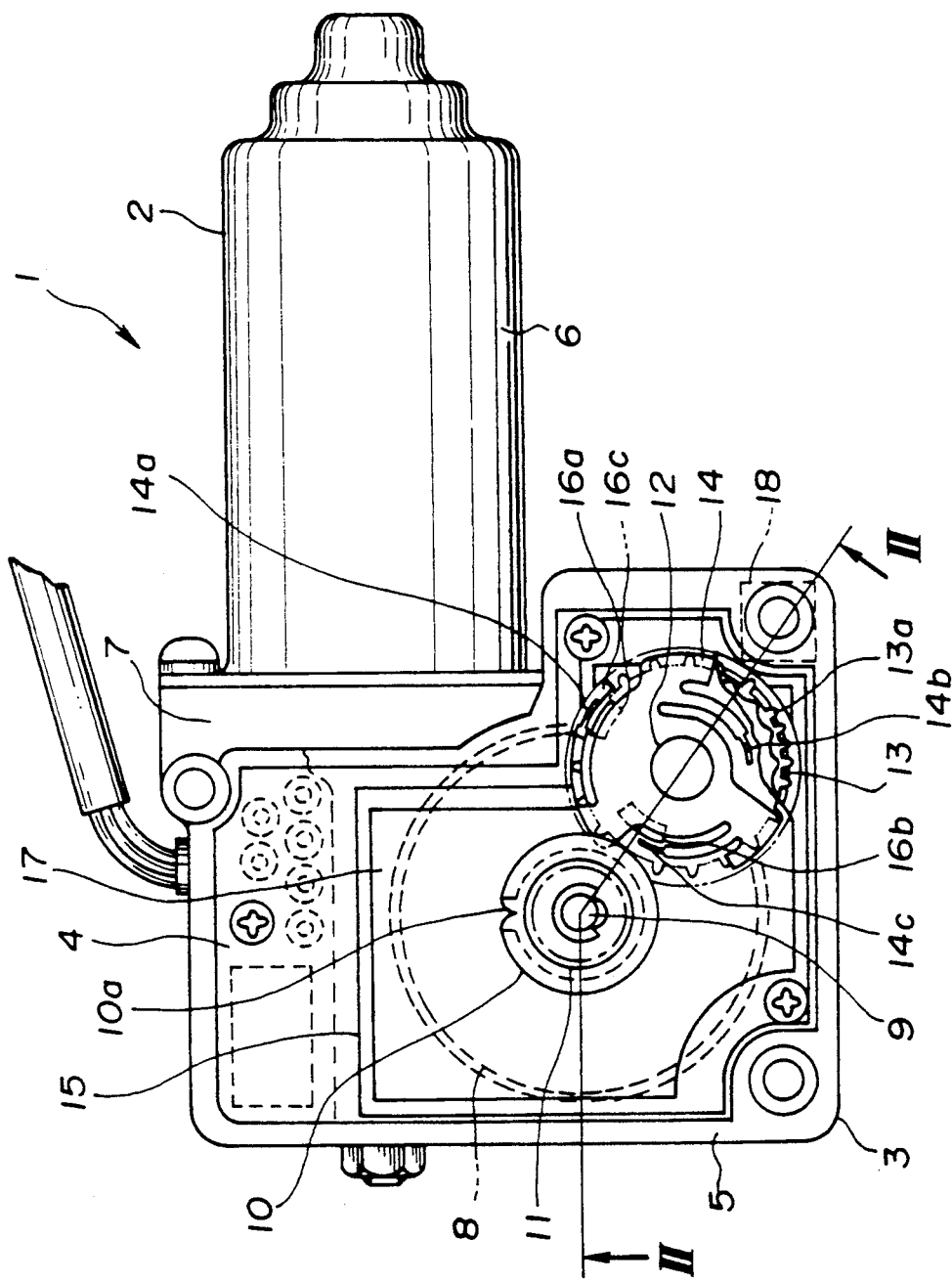
FIG. 1 is a plan view illustrating an embodiment of the sunroof motor according to this invention.
Figure 2:
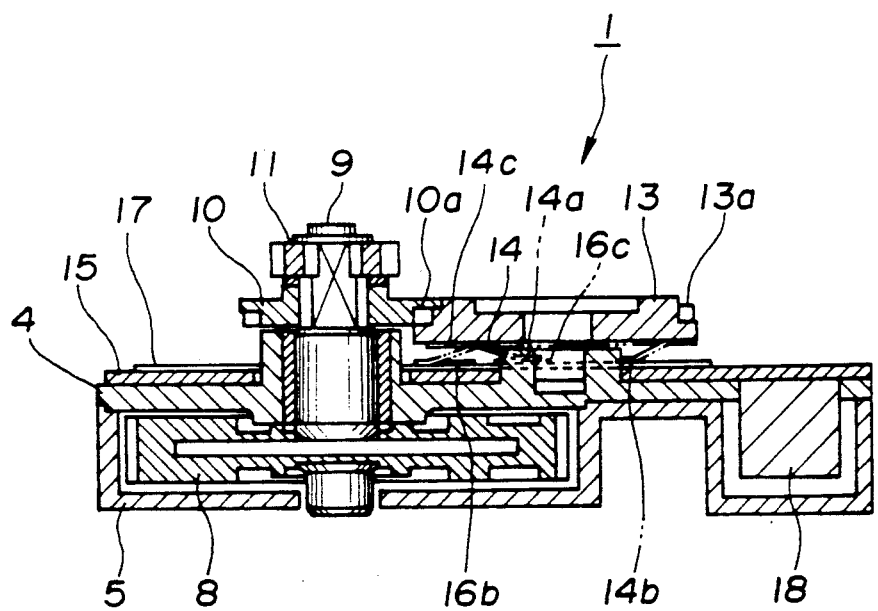
FIG. 2 is a sectional view along section lines II—II of FIG. 1.

A sunroof motor 1 is composed of a motor part 2 and an output part 3, the output part 3 is provided with a base 4 and a gear case 5 as shown in FIG. 1 and FIG. 2.

The base 4 is formed in one body united with an end bracket 7 covering a motor casing 6, the gear case 5 is housed with a worm wheel 8, and the worm wheel 8 is meshed with a worm formed on one end of a motor shaft (not shown) passing through the end bracket 7 and protruding in the gear case 5.

One end of a worm wheel shaft (output shaft) 9 secured with the worm wheel 8 is supported rotatably by the gear case 5, and another end of the worm wheel shaft 9 thrusts through the base 4 so as to protrude outwardly. A cam wheel 10 having a projection 10a and a pinion 11 are fitted successively on the another end of the worm wheel shaft 9. The pinion 11 is wound with a wire (not shown) connected to a roof lid stretchingly between the pinion 11 and the roof lid, and the roof lid is so structured as to be driven in the opening or closing direction by transmitting power through the wire.

The base 4 is provided with a gear shaft pin 12, and the gear shaft pin 12 fitted with a gear 13 to be turned according to the cam wheel 10 as a roof lid detective disc in this embodiment. The gear 13 is formed with a plurality of teeth 13a meshed with the projection 10a of the cam wheel 10 on the outer periphery thereof, and is designed so as to turn as much as one tooth with every rotation of the cam wheel 10 fixed to the worm wheel shaft (output shaft) 9.

Figure 3:
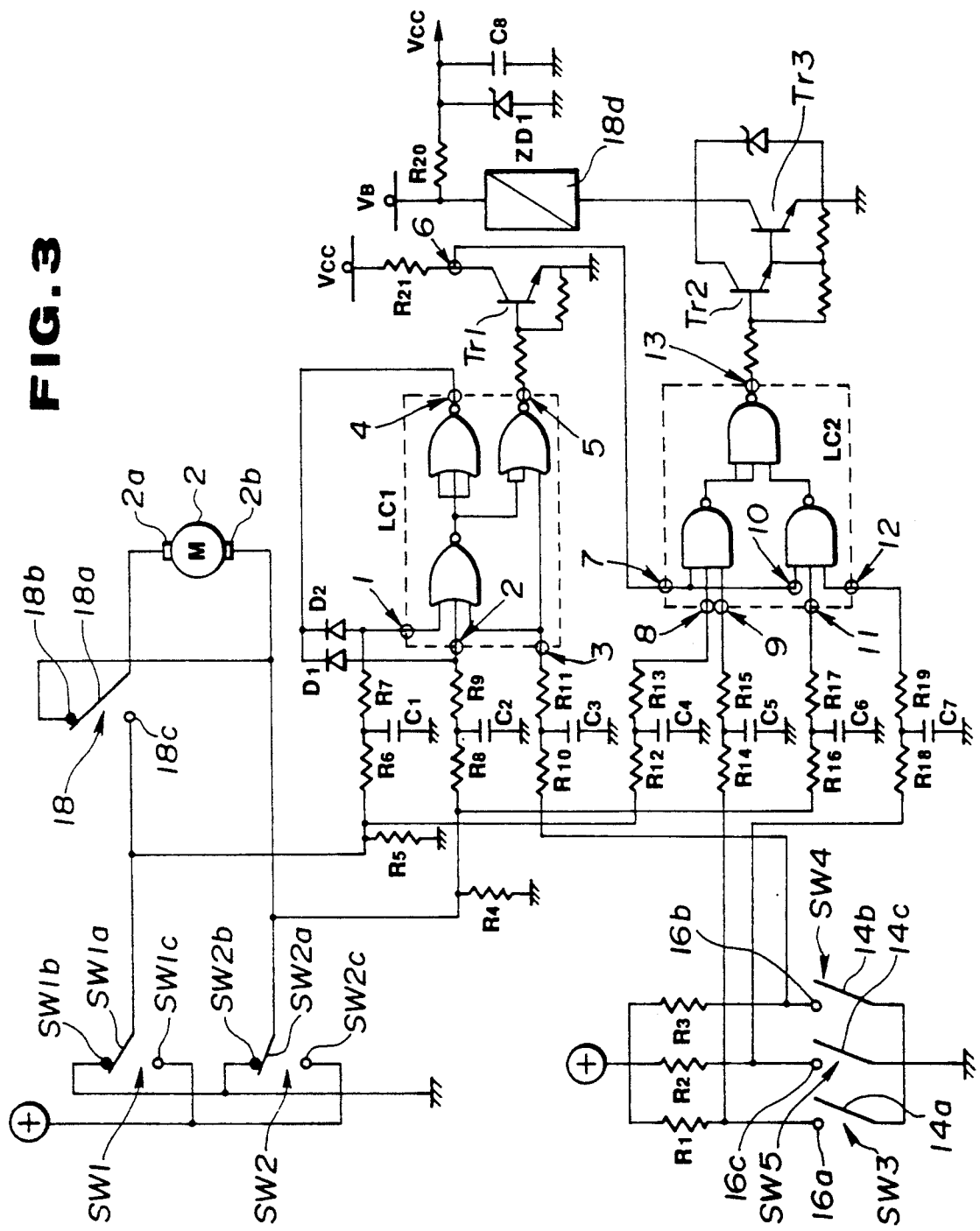
FIG. 3 is a wiring diagram illustrating the circuit configuration of the motor driving circuit of the sunroof motor shown in FIG. 1.
Figure 4A:
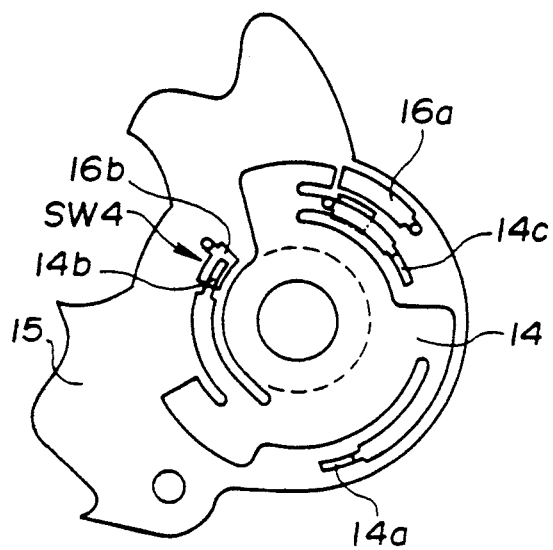
FIG. 4A to 4H are schematic views successively illustrating state of electrical contact between the contacts of the contact plate and the board-side contacts of the motor driving circuit.

Furthermore, a contact plate 14 is disposed on a face of the gear 13 which is the roof lid detective disc, and the contact plate 14 is provided with three contacts 14a, 14b and 14c in this embodiment as also shown in FIG. 3 and FIG. 4A.

Additionally, on the base 4, a printed wiring board 15 is disposed opposite to the face of the gear 13. The printed wiring board 15 is provided with board-side contacts 16a, 16b and 16c for contacting with or separating from the three contacts 14a, 14b and 14c according to the turn of the gear 13, and these board-side contacts 16a, 16b and 16c form a motor driving circuit 17 shown in FIG. 3 together with devices such as resistors, capacitor and the like (not shown) on the printed wiring board 15.

The board-side contact 16a is so disposed on the printed wiring board 15.

Figure 4B:
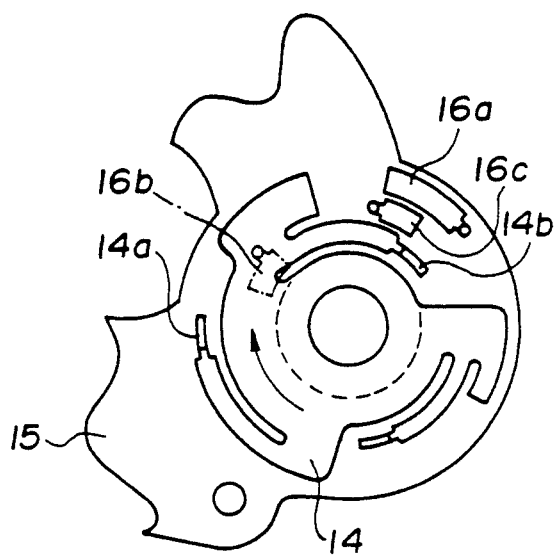
Figure 4C:
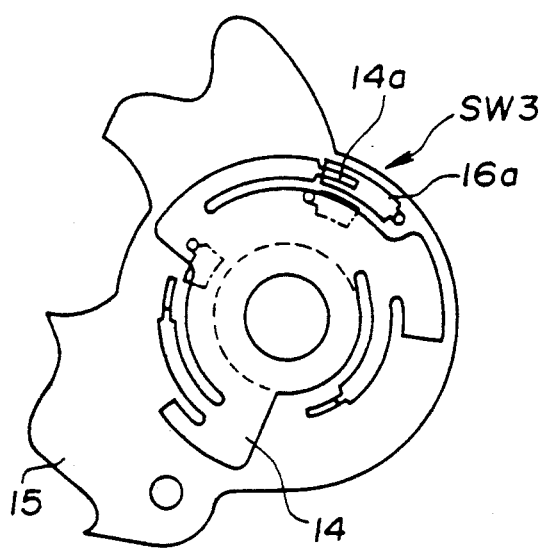

The board-side contact 16a is so disposed on the printed wiring board 15 as to form a first switch element SW3 together with the contact 14a of the contact plate 14 as shown in FIG. 3 and FIG. 4C for detecting the roof lid to arrive at the full-opened position by sensing the board-side contact 16a to be in contact electrically with the contact 14a when the roof lid arrives at the full-opened position.

The board-side contact 16b is so disposed on the printed wiring board 15 as to form a second switch element SW4 together with the contact 14b of the contact plate 14 as shown in FIG. 3 and FIG. 4A for detecting the roof lid to arrive at the full-closed position by sensing the board-side contact 16b to be in contact electrically with the contact 14b when the roof lid arrives at the full-closed position.

Figure 4D:
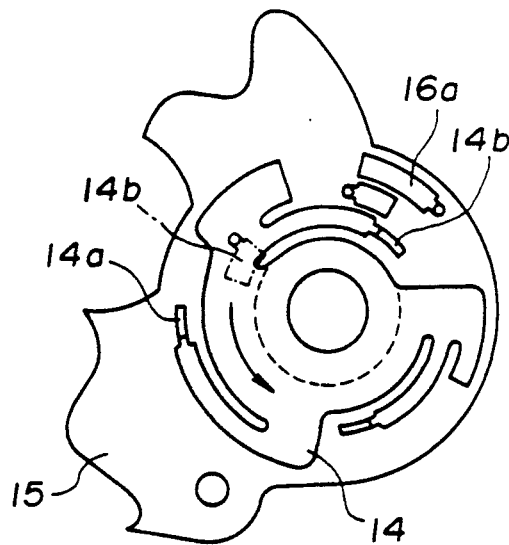
Figure 4E:
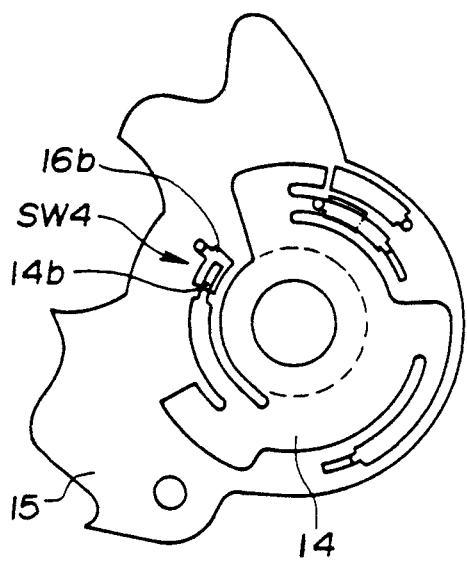
Figure 4F:
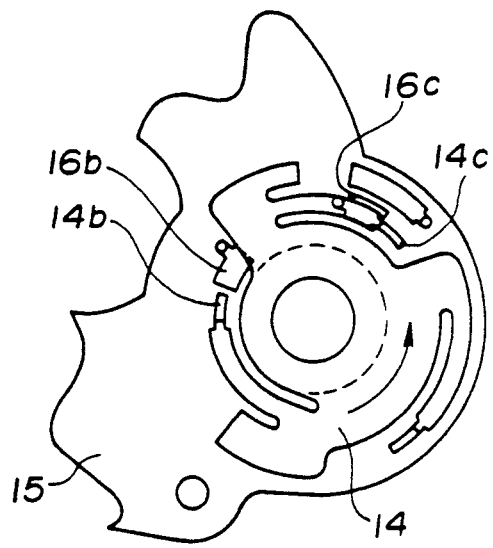
Figure 4G:
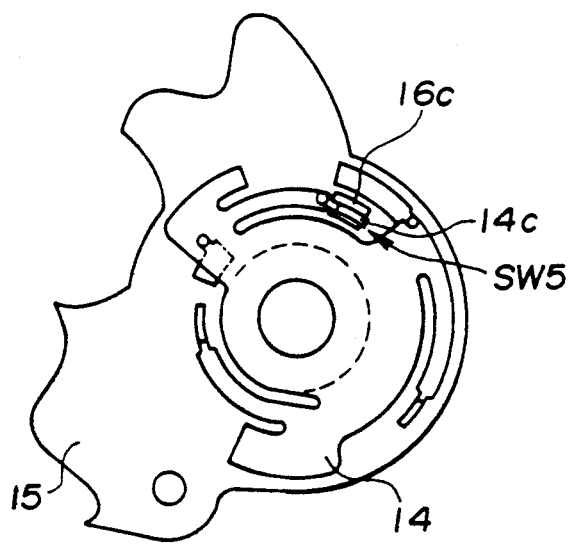

In addition, the board-side contact 16c is so disposed on the printed wiring board 15 as to form a third switch element SW5 together with the contact 14c of the contact plate 14 as shown in FIG. 3 and FIG. 4G for detecting the roof lid to arrive at the tilt-up position by sensing the board-side contact 16c to be in contact electrically with the contact 14c when the roof lid arrives at the tilt-up position.

Furthermore, the printed wiring board 15 is mounted with a relay 18 for supplying or shutting the electric power to the motor part 2 of the sunroof motor 1 in response to an operation of a sunroof switch composed of a open-side switch element SW1 and a close-side switch element SW2 and situations of the switch elements SW3, SW4 and SW5.

FIG. 3 is a wiring diagram illustrating the circuit configuration of the motor driving circuit 17 formed on the printed wiring board 15 and incorporated with the relay 18 and the board-side contacts 16a, 16b and 16c as described above.

In FIG. 3, the motor driving circuit 17 is designed so as to supply the electric power to the motor part 2 of the sunroof motor 1 through the relay 18 in response to the operation of the sunroof switch having two switch elements SW1 and SW2, and the relay 18 is structured so as to change to the ON-state by exciting the relay coil 18d.

Namely, a power terminal 2a of the motor part 2 is connected to a travelling contact 18a of the relay 18, and another power terminal 2b of the motor part 2 is connected to a normal close-side contact 18b of the relay 18 and a movable contact SW2a of the switch element SW2 of the sunroof switch. A normal open-side contact 18c of the relay 18 is connected to a movable contact SW1a of the switch element SW1 of the sunroof switch.

One end of the relay coil 18d of the relay 18 is connected to the power, and another end of the relay coil 18d is connected to the collector of a transistor Tr3 to be actuated by a transistor Tr2, and the emitter of the transistor Tr3 is grounded.

In the sunroof switch, a contact SW1b of the open-side switch element SW1 and a contact SW2b of the close-side switch element SW2 are grounded, and another contact SW1c of the open-side switch element SW1 and another contact SW2c of the close-side switch element SW2 are connected to the power source.

The board-side contacts 16a, 16b and 16c are connected to the power source through respective resistors R1, R3 and R2, and the contacts 14a, 14b and 14c of the contact plate 14 to contact with the board-side contacts 16a, 16b and 16c are grounded.

The motor driving circuit 17 is also provided with a first logical operation circuit LC1 composed of three NOR circuits and a second logical operation circuit LC2 composed of three NAND circuits. The movable contacts SW1a and SW2a of the sunroof switch and the board-side contact 16b are connected to the input side of the first logical operation circuit LC1 through respective resistors, and the logical operation circuit LC1 is so designed as to output an signal into the base of a transistor Tr1 of which collector is connected to the power through a resistor R21 and of which emitter is grounded. Additionally, the movable contacts SW1a and SW2a of the sunroof switch, the board-side contacts 16a and 16c and the collector of the transistor Tr1 are connected to the input side of the second logical operation circuit LC2 through respective resistors, and the logical operation circuit LC2 is so designed as to output an signal into the base of the transistor Tr2. And the collector of the transistor Tr2 is connected to the relay coil 18d of the relay 18 and the emitter of the transistor Tr2 is connected to the base of the transistor Tr3 and grounded through a resistor.

Explanation will be given below about the working of the sunroof motor 1 having the aforementioned mechanism and circuit configuration with reference to FIG. 3 and FIGS. 4A to 4H.

When the sunroof is closed at the beginning, the roof lid is in the full-closed position and the contact plate 14 is sited at the position as shown in FIG. 4A, the contact 14b of the contact plate 14 is in contact electrically with the board-side contact 16b of the motor driving circuit 17, namely the switch element SW4 is in the ON-state.

In the motor driving circuit 17 shown in FIG. 3, the movable contacts SW1a and SW2a of the sunroof switch are in contact with the grounded contacts SW1 and SW2b, respectively since the sunroof switch is not operated yet. And only the contact 14b of the contact plate 14 is in contact with the board-side contact 16b as described above. Accordingly, input and output signal in the logical operation circuits LC1 and LC2 stand in a state shown in Table 1.

TABLE 1

| | LC1 | | | | | LC2 | | | |
|---|---|---|---|---|---|---|---|---|---|
| Input | ① | ② | ③ | ⑦ | ⑧ | ⑨ | ⑩ | ⑪ | ⑫ |
| | L | L | L | H | L | H | H | L | H |
| Output | ④ | ⑤ | | | | ⑬ | | | |
| | L | L | | | | L | | | |

Namely, potential levels of input signals at points ①, ②, ③, ⑧ and ⑪ are "L" since they are grounded through the sunroof switch and the switch element SW4. Potential levels of input signals at points ⑨ and ⑫ are "H" since they are connected to the power source through the respective resistors, and potential levels of input signals at points ⑦ and ⑩ are "H" because they are connected to the power through the resistor R21 and the transistor Tr1 is in the OFF-state (output signal level at point ⑤ is "L"), so that the potential level at point ⑥ is maintained at "H".

Therefore, the relay coil 18d of the relay 18 is not excited because the output signal level at point ⑬ is "L" and the transistors Tr2 and Tr3 are in the OFF-states, so that the travelling contact 18a of the relay 18 remains in contact with the normal close-side contact 18b (OFF-state).

In this state, when the sunroof switch is operated in the opening side, the open-side switch element SW1 of the sunroof switch is changed on and the movable contact SW1a turns to the contact SW1c connected to the power source from the contact SW1b.

In this time, the potential level of the input signal at point ① is maintained at "L" by the action of a diode D2 and the input and output signals in the logical operation circuit LC1 remain in the state shown in Table 1 in spite of the ON-operation of the sunroof switch. And the input signal level of the logical operation circuit LC2 at point ⑧ changes to "H" according to the ON-operation of the sunroof switch, whereby the output signal level at point ⑬ turns into "H" as shown in Table 2, and the transistors Tr2 and Tr3 change to the ON-states, thereby exciting the relay coil 18d of the relay 18.

TABLE 2

| | LC1 | | | | | LC2 | | | |
|---|---|---|---|---|---|---|---|---|---|
| Input | ① | ② | ③ | ⑦ | ⑧ | ⑨ | ⑩ | ⑪ | ⑫ |
| | L | L | L | H | H | H | H | L | H |
| Output | ④ | ⑤ | | | | ⑬ | | | |
| | L | L | | | | H | | | |

By the excitation of the relay coil 18d, the travelling contact 18a of the relay 18 turns to the normal open-side contact 18c (ON-state) and an electric current flows to the ground from the power source through the contact SW1c of the switch element SW1 of the sunroof switch, the movable contact SW1a, the normal open-side contact 18c of the relay 18, the travelling contact 18a, the power terminals 2a and 2b of the motor part 2, the movable contact SW2a of the switch element SW2 of the sunroof switch, and the grounded contact SW2b of the switch element SW2. And the worm wheel shaft (output shaft) 9 rotates, thereby driving the roof lid in the opening direction.

When the roof lid begins to move in the opening direction, the contact plate 14 turns in the clockwise direction according to the rotation of the cam wheel 10 fixed to the worm wheel shaft 9 as shown in FIG. 4B together with the gear 13 and the contact 14b of the contact plate 14 separates from the board-side contact 16b of the motor driving circuit 17, thereby changing the switch element SW4 to the OFF-state.

In consequence of the change of the switch element SW4 into the OFF-state, the potential level of the input signal at point ③ changes to "H" and the output signal level from the logical operation circuit LC1 at point ④ also changes to "H", however the output signal at point ⑤ does not change, and the potential levels at points ⑥, ⑦ and ⑩ are maintained at "H" as shown in Table 3. Therefore, the input and output signals of the logical operation circuit LC2 do not change and the relay 18 is maintained in the ON-state, whereby the worm wheel shaft 9 of the sunroof motor 1 continues to rotate.

TABLE 3

| | LC1 | | | | | LC2 | | | |
|---|---|---|---|---|---|---|---|---|---|
| Input | ① | ② | ③ | ⑦ | ⑧ | ⑨ | ⑩ | ⑪ | ⑫ |
| | H | L | H | H | H | H | H | L | H |
| Output | ④ | ⑤ | | | | ⑬ | | | |
| | H | L | | | | H | | | |

When the roof lid arrives at the full-opened position, the contact 14a of the contact plate 14 comes in touch with the board-side contact 16a of the motor driving circuit 17 as shown in FIG. 4C, namely the switch element SW3 changes to the ON-state according to the movement of the roof lid. Whereby, the input and output signals of the logical operation circuit LC1 remain in the state as shown in Table 3, and the output signal level from the logical operation circuit LC2 at point ⑬ changes to "L" because the switch element SW3 causes the input signal level at point ⑨ to be "L" as shown in Table 4.

TABLE 4

| | L C 1 | | | | | L C 2 | | | |
|---|---|---|---|---|---|---|---|---|---|
| Input | ① H | ② L | ③ H | ⑦ H | ⑧ H | ⑨ L | ⑩ H | ⑪ L | ⑫ H |
| Output | ④ H | ⑤ L | | | | | ⑬ L | | |

Accordingly, the transistors Tr2 and Tr3 change to the OFF-states owing to the change of the output signal level at point ⑬ into "L", and the excitation of the relay coil 18d is discontinued, thereby returning the traveling contact 18a of the relay 18 to the normal close-side contact 18b from the normal open-side contact 18c. And the power supply to the motor part 2 is shut off, so that the roof lid stops at the full-opened position.

In this case, when the movable contact SW1a of the switch element SW1 returns to the grounded contact SW1b by releasing the sunroof switch, the potential levels of the input signals at points ① and ⑧ changes to "L" since they are grounded, but the output signal levels at points ⑤ and ⑬ of the logical operation circuits LC1 and LC2 do not change as shown in Table 5.

TABLE 5

| | L C 1 | | | | | L C 2 | | | |
|---|---|---|---|---|---|---|---|---|---|
| Input | ① L | ② L | ③ H | ⑦ H | ⑧ L | ⑨ L | ⑩ H | ⑪ L | ⑫ H |
| Output | ④ H | ⑤ L | | | | | ⑬ L | | |

By operating the sunroof switch in the closing side, the close-side switch element SW2 of the sunroof switch is changed on and the movable contact SW2a turns to the contact SW2c connected to the power source from the contact SW2b. Whereby, the input signal levels at points ② and ⑪ change to "H" and the output signal from the logical operation circuit LC1 at point ⑤ does not change but the output signal level from the logical operation circuit LC2 at point ⑬ changes to "H" as shown in Table 6. And the relay coil 18d of the relay 18 is excited and the relay 18 turns to the ON-state.

TABLE 6

| | L C 1 | | | | | L C 2 | | | |
|---|---|---|---|---|---|---|---|---|---|
| Input | 1 L | 2 H | ③ H | ⑦ H | ⑧ L | ⑨ L | ⑩ H | ⑪ H | ⑫ H |
| Output | ④ H | ⑤ L | | | | | ⑬ H | | |

In consequence of the change of the relay 18, an electric current flows from the power source to the ground through the contact SW2c of the switch element SW2 of the sunroof switch, the movable contact SW2a, the power terminals 2b and 2a of the motor part 2, the travelling contact 18a, the normal open-side contact 18c of the relay 18, the movable contact SW1a of the switch element SW1 of the sunroof switch, and the grounded contact SW1b of the switch element SW1, and the worm wheel shaft 9 rotates in the reverse direction, thereby driving the roof lid in the closing direction.

When the roof lid begins to move in the closing direction, the contact plate 14 turns in the anticlockwise direction as shown in FIG. 4D together with the gear 13 and the contact 14a of the contact plate 14 separates from the board-side contact 16a of the motor driving circuit 17, thereby changing the switch element SW3 to the OFF-state.

In this time, the potential level of the input signal at point ⑨ changes to "H". However the input and output signals of the logical operation circuit LC1 and the output signal from the logical operation circuit LC2 do not change as shown in Table 7, therefore the worm wheel shaft 9 of the sunroof motor 1 continues to rotate in the reverse direction.

TABLE 7

| | L C 1 | | | | | L C 2 | | | |
|---|---|---|---|---|---|---|---|---|---|
| Input | ① L | ② L | ③ H | ⑦ H | ⑧ L | ⑨ H | ⑩ H | ⑪ H | ⑫ H |
| Output | ④ H | ⑤ L | | | | | ⑬ H | | |

When the roof lid arrives at the full-closed position, the contact 14b of the contact plate 14 comes in touch with the board-side contact 16b of the motor driving circuit 17 as shown in FIG. 4E. According to the ON-state of the switch element SW4, the input signal level at point ③ changes to "L" and the output signal level from the logical operation circuit LC1 at point ⑤ changes to "H", whereby the potential levels at points ⑥, ⑦ and ⑩ change to "L" since the output signal with "H" level at point ⑤ actuates the transistor Tr1 into the ON-state. And the output signal level from the logical operation circuit LC2 at point ⑬ changes to "L" as shown in Table 8, so that the excitation of the relay coil 18d of the relay 18 is discontinued and the power supply to the motor part 2 is shut off, consequently the roof lid stops at full-closed position.

TABLE 8

| | L C 1 | | | | | L C 2 | | | |
|---|---|---|---|---|---|---|---|---|---|
| Input | ① L | ② H | ③ L | ⑦ L | ⑧ L | ⑨ H | ⑩ L | ⑪ H | ⑫ H |
| Output | ④ H | ⑤ H | | | | | ⑬ L | | |

If the movable contact SW2a of the switch element SW2 returns to the grounded contact SW2b by releasing the sunroof switch, the potential levels of the input and output signals in the logical operation circuits LC1 and LC2 return to the state as shown in Table 1.

In this state, when the sunroof switch is further operated in the closing side (tilting up side), the switch element SW2 of the sunroof switch is changed on and the movable contact SW2a turns to the contact SW2c connected to the power source from the contact SW2b.

In this case, the potential level of the input signal at point ② is maintained at "L" by the action of a diode D1 and the input and output signals of the logical operation circuit LC1 remain in the state shown in Table 1 in spite of the ON-operation of the sunroof switch. And the input signal level at point ⑪ changes to "H" according to the ON-operation of the sunroof switch, whereby the output signal level from the logical operation circuit LC2 at point ⑬ changes to "H" as shown in Table 9. And the relay coil 18d of the relay 18 is excited owing to the ON-states of the transistors Tr2 and Tr3, thereby changing the relay 18 to the ON-state.

TABLE 9

| | L C 1 | | | | | L C 2 | | | |
|---|---|---|---|---|---|---|---|---|---|
| Input | ① L | ② L | ③ L | ⑦ H | ⑧ L | ⑨ H | ⑩ H | ⑪ H | ⑫ H |
| Output | ④ L | ⑤ L | | | | | ⑬ H | | |

Accordingly, the electric current flows as described above and the worm wheel shaft 9 rotates in the reverse direction, thereby driving the roof lid in the tilting up direction.

When the roof lid begins to tilt toward the tilt-up position, the contact plate 14 turns in the anticlockwise direction as shown in FIG. 4F together with the gear 13 and the contact 14b of the contact plate 14 separates from the board-side contact 16b of the motor driving circuit 17, thereby changing the switch element SW4 to the OFF-state.

In consequence of the change of the switch element SW4, the potential level of the input signal at point ③ changes to "H" and the output signal level at point ④ also changes to "H", but the output signal from the logical operation circuit LC1 at point ⑤ does not change as shown in Table 10, and the input and output signals of the logical operation circuit LC2 remain in the state shown in Table 9, therefore the worm wheel shaft 9 of the sunroof motor 1 continues to rotate in the reverse direction.

TABLE 10

| | L C 1 | | | | | L C 2 | | | |
|---|---|---|---|---|---|---|---|---|---|
| Input | ① L | ② H | ③ H | ⑦ H | ⑧ L | ⑨ H | ⑩ H | ⑪ H | ⑫ H |
| Output | ④ H | ⑤ L | | | | | ⑬ H | | |

When the roof lid arrives at the tilt-up position, the contact 14c of the contact plate 14 comes in touch with the board-side contact 16c of the motor driving circuit 17, namely the switch element SW5 changes to the ON-state as shown in FIG. 4G according to the movement of the roof lid. Since the input signal level at point ⑫ changes to "L" owing to the ON-state of the switch element SW5, the input and output signals of the logical operation circuit LC1 do not change and the output signal level from the logical operation circuit LC2 at point ⑬ changes to "L" as shown in Table 11. And, the excitation of the relay coil 18d of the relay 18 is discontinued and the power supply to the motor part 2 is shut off, so that the roof lid stops at tilt-up position.

TABLE 11

| | L C 1 | | | | | L C 2 | | | |
|---|---|---|---|---|---|---|---|---|---|
| Input | ① L | ② H | ③ H | ⑦ H | ⑧ L | ⑨ H | ⑩ H | ⑪ H | ⑫ L |
| Output | ④ H | ⑤ L | | | | | ⑬ L | | |

When the movable contact SW2a of the switch element SW2 returns to the grounded contact SW2b by releasing the sunroof switch, the potential levels of the input signals at points ② and ⑪ changes to "L", but the output signal levels at points ⑤ and ⑬ of the logical operation circuits LC1 and LC2 do not change as shown in Table 12.

TABLE 12

| | L C 1 | | | | | L C 2 | | | |
|---|---|---|---|---|---|---|---|---|---|
| Input | ① L | ② L | ③ H | ⑦ H | ⑧ L | ⑨ H | ⑩ H | ⑪ L | ⑫ L |
| Output | ④ H | ⑤ L | | | | | ⑬ L | | |

At the case in which the roof lid is in the tilt-up position, by operating the sunroof switch in the opening side (tilting down side), the switch element SW1 of the sunroof switch is changed on and the movable contact SW1a turns to the contact SW1c connected to the power source from the grounded contact SW1b. Whereby, the input signal levels at points ① and ⑧ change to "H" and the output signal level from the logical operation circuit LC1 at point ⑤ is maintained at "L", but the output signal level from the logical operation circuit LC2 at point ⑬ changes to "H" as shown in Table 12. And the relay coil 18d of the relay 18 is excited, thereby changing the relay 18 to the ON-state.

TABLE 13

| | L C 1 | | | | | L C 2 | | | |
|---|---|---|---|---|---|---|---|---|---|
| Input | ① H | ② L | ③ H | ⑦ H | ⑧ H | ⑨ H | ⑩ H | ⑪ H | ⑫ L |
| Output | ④ H | ⑤ L | | | | | ⑬ H | | |

In consequence of the change of the relay 18 into ON-state, an electric current flows from the power source to the ground through the contact SW1c of the switch element SW1 of the sunroof switch, the movable contact SW1a, the normal open-side contact 18c of the relay 18, the travelling contact 18a, the power terminals 2a and 2b of the motor part 2, the movable contact SW2a of the switch element SW2 of the sunroof switch, and the grounded contact SW2b of the switch element SW2. And the worm wheel shaft 9 rotates, thereby driving the roof lid in the downward direction from the tilt-up position.

Figure 4H:
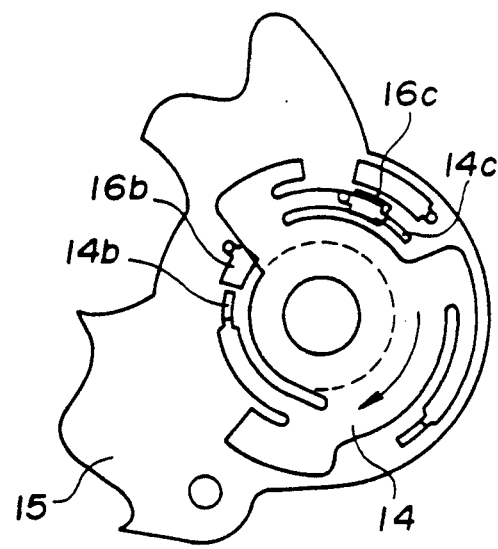
Figure 5:
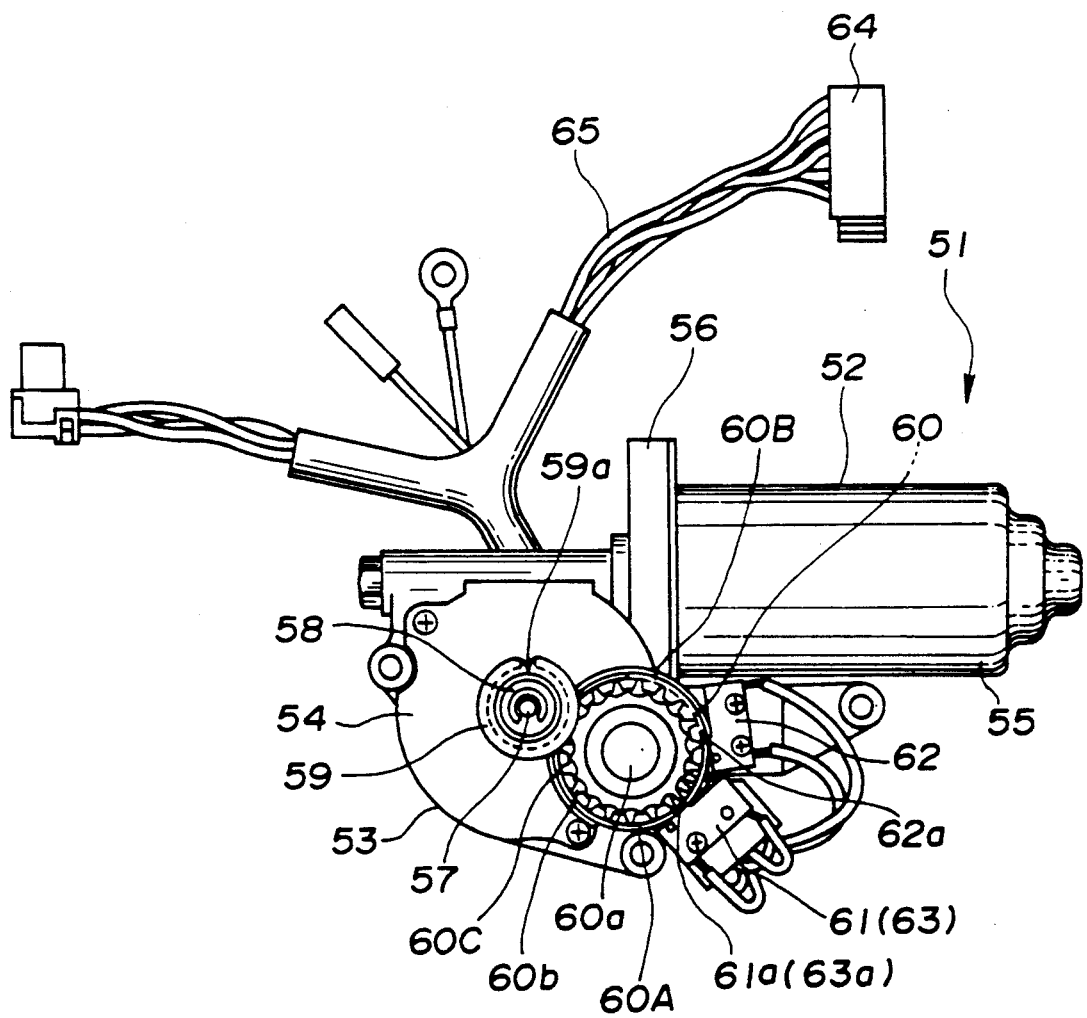
FIG. 5 is a plan view of the conventional sunroof motor.

When the roof lid begins to move toward the full-closed position, the contact plate 14 turns in the clockwise direction as shown in FIG. 4H together with the gear 13 and the contact 14c of the contact plate 14 separates from the board-side contact 16c of the motor driving circuit 17, thereby changing the switch element SW5 to the OFF-state.

According to the OFF-state of the switch element SW5, the input signal level at point ⑫ changes to "H", but the output signal level from the logical operation circuit LC2 at point ⑬ remains at "H" as shown in Table 14, therefore the worm wheel shaft 9 of the sunroof motor 1 continues to rotate.

TABLE 14

| | L C 1 | | | | | L C 2 | | | |
|---|---|---|---|---|---|---|---|---|---|
| Input | ① H | ② L | ③ H | ⑦ H | ⑧ H | ⑨ H | ⑩ H | ⑪ L | ⑫ H |
| Output | ④ H | ⑤ L | | | | | ⑬ H | | |

When the roof lid arrives at the full-closed position from the tilt-up position, the contact 14b of the contact plate 14 comes in touch with the board-side contact 16b of the motor driving circuit 17 as shown in FIG. 4A. The input signal level at point ③ changes to "L" according to the ON-state of the switch element SW4, and the output signal level from the logical operation circuit LC1 at point ⑤ changes to "H", whereby the potential levels at points ⑥, ⑦ and ⑩ change to "L" because the output signal with "H" level changes the transistor Tr1 to the ON-state. And the output signal level from the logical operation circuit LC2 at point ⑬ changes to "L" as shown in Table 15, so that the excitation of the relay coil 18d of the relay 18 is discontinued and the power supply to the motor part 2 is shut off. Consequently the roof lid stops at the full-closed position.

TABLE 15

|  | LC1 | | | LC2 | | | | | |
| --- | --- | --- | --- | --- | --- | --- | --- | --- | --- |
| Input | ① H | ② L | ③ L | ⑦ L | ⑧ H | ⑨ H | ⑩ L | ⑪ L | ⑫ H |
| Output | ④ H | ⑤ H | | | | | ⑬ L | | |

As mentioned above, in the sunroof motor according to this invention having the above-mentioned structure, the position of the roof lid is detected without using microswitches, which are noisy and troublesome in installation, in order to stop the roof lid at the full-opened position, the full-closed position or the like, and the relay is mounted directly on the printed wiring board. Therefore, excellent effects can be obtained in that it is possible to prevent a noise unpleasant to the passengers and possible to reduce the cost of the products by reducing the assembling man-hour.

What is claimed is:

1. A sunroof motor comprising:
   a motor part for rotating an output shaft forwardly and reversely;
   a roof lid detective disc to be turned according to the rotation of said output shaft as much as an angle in proportion to an amount of movement of a roof lid driven by the forward and reverse rotation of said output shaft;
   a contact plate disposed on a face of said roof lid detective disc and provided with a plurality of contacts; and
   a printed wiring board disposed opposite to the face of said roof lid detective disc, formed with a motor driving circuit and mounted with a relay to supply or shut off the electric power to the motor part;
   said motor driving circuit of the printed wiring board being provided with a plurality of board-side contacts for detecting the roof lid to arrive at predetermined positions on bases of electrical contact with said contacts of the contact plate and shutting off the electrical power to the motor part through said relay.

2. A sunroof motor as set forth in claim 1, wherein said roof lid detective disc is a gear to be turned as much as one tooth by every rotation of said output shaft.

3. A sunroof motor as set forth in claim 2, wherein said contact plate is provided with three contacts, and said motor driving circuit is disposed with three board-side contacts for detecting the roof lid to arrive at a full-opened position, a full-closed position and a tilt-up position, respectively.

* * * * *